US008692798B1

(12) United States Patent
Zhang

(10) Patent No.: US 8,692,798 B1
(45) Date of Patent: Apr. 8, 2014

(54) LIGHT ACTIVATED INPUT PANEL

(76) Inventor: Wei Zhang, Newtown, PA (US)

( * ) Notice: Subject to any disclaimer, the term of this patent is extended or adjusted under 35 U.S.C. 154(b) by 166 days.

(21) Appl. No.: 13/327,372

(22) Filed: Dec. 15, 2011

(51) Int. Cl.
*G06F 3/045* (2006.01)
*G06F 3/041* (2006.01)
*G06F 3/042* (2006.01)

(52) U.S. Cl.
USPC .......................... 345/174; 345/173; 345/175

(58) Field of Classification Search
USPC ................................... 345/173–183
See application file for complete search history.

(56) References Cited

U.S. PATENT DOCUMENTS

| 7,649,527 | B2 | 1/2010 | Cho |
| 2005/0052435 | A1* | 3/2005 | Cho et al. ...................... 345/182 |
| 2006/0138574 | A1* | 6/2006 | Saito et al. .................... 257/417 |
| 2010/0117979 | A1* | 5/2010 | Hillis ............................. 345/173 |
| 2010/0295820 | A1* | 11/2010 | Kikin-Gil ...................... 345/175 |
| 2011/0025631 | A1* | 2/2011 | Han ............................. 345/173 |

* cited by examiner

*Primary Examiner* — Alexander Eisen
*Assistant Examiner* — Amit Chatly

(57) ABSTRACT

Generally, a layer of light-induced shape-memory polymer (LISMP) is incorporated into touch input device in such way that its localized volume change caused by light activation of incidence light beam becomes detectable by sensing means of the touch input device. In accordance with the invention, one embodiment for the light activated input panel comprises two electrode layers respectively laid on two plates and separated by a predetermined gap and a layer of LISMP in between the two electrode layers. The layer of LISMP transforms illumination of incidence light beam into localized capacitance variation through localized volume change of LISMP activated by the illumination, which, in turn, is detected as a valid input by capacitive sensing means formed by the two electrode layers. Later, the localized volume change is restored through side light exposure by a side light source next to side of the layer of LISMP.

19 Claims, 19 Drawing Sheets

LIGHT ACTIVATED INPUT PANEL

CROSS-REFERENCE TO RELATED APPLICATIONS

Not Applicable.

STATEMENT REGARDING FEDERALLY SPONSORED RESEARCH OR DEVELOPMENT

Not Applicable.

FIELD OF THE INVENTION

The present invention generally relates to input devices for computer or display such as touch panel or touch display, digitizer or digitizing tablet, touchpad, and the like, and, in particular, relates to input device working conjunctively with light pointer or light stylus or light pen.

BACKGROUND OF THE INVENTION

Touch input device for computer interface input and display is normally activated or operated by detecting touching or proximity presence of user's finger or sharp end of a stylus. The touching typically requires to push sensing surface of the device with certain force to activate a valid detection. The proximity presence does not require to touch or push the device surface, but may require touching end of finger or stylus capable of interfering sensing filed of the device in proximity. For example, for capacitive sensing or inductance sensing, dry skin of finger may not cause sufficient disturbance to sensing electrical field, thus causing irresponsive to presence of the finger on the sensing surface. If touching end of stylus is made of electrical insulation material, it will not interfere with sensing electrical field to activate a valid detection. Such problem may be solved by wearing a conductive cover on finger or making touching end of stylus of conductive material. During operation, touching with certain force may scratch the sensing surface to induce system failure after long term use or smear displayed image for touch display application due to either scratching or contamination. Anti-scratching coating may be put on top of the sensing surface to alleviate the scratching problem. Although not having scratching issue, proximity presence sensing often experiences false detection or inaccurate position measurement of input. Using specially made stylus may dramatically improve detection reliability and accuracy. However, due to nature of proximity sensing, measurement accuracy of input position is limited. Both touching detection and proximity presence detection don't work if input objective such as finger or stylus is placed not very close to the sensing surface. So, remote operation is not feasible for commonly used touch input device.

A type of input device may detect a light beam upon its sensing surface, similar as a touch input using finger or stylus. Such type of input device previously uses a photodetector array made on a substrate to detect position of the incidence light beam. The light beam is normally sent out by a light pointer or a light pen or light stylus. The light pointer or a light pen does not have to be placed in proximity to the sensing surface. Thus, the type of input device may be operated remotely as far as the light beam incidences sufficient light intensity to activate the photodetectors. Such remote operation is not possible for touch input devices such as resistive type, capacitive type, inductive type, or other proximity sensing type. This remote operation capability is desired by remote control of user interface for computer driven large size flat panel display or large size flat panel display TV. In these applications, user may sit or stand several meters away from the display and perform all kinds of user interface operation, for example, internet related operation such as web surfacing, message checking, multimedia playing and so on. However, cost of making photodetector array and related control electronics is very high. The cost issue becomes worse when size of display increases, thus causing a dilemma that large size display calls out need of the remote operation but it is more unlikely to get that made under a reasonable penalty of cost increase. Within foreseeable future, unless integration of photodetector array with image pixels of flat panel display achieves a significant breakthrough, it is not practical to make such type of input device price/benefit competitive to touch input device and justify its cost incurred for adding the functionality.

Therefore, low cost input device working conjunctively with a light pointer or a light pen is demanded for non-touching and remote operation of computer based user interface or similar uses.

The information disclosed in this Background of the Invention section is only for the enhancement of understanding of the background of the invention, and should not be taken as an acknowledgment or any form of suggestion that this information forms a prior art that would already be known to a person skilled in the art.

BRIEF SUMMARY OF THE INVENTION

Generally, the invention aims to implement light-induced shape-memory polymer (LISMP), also called light-activated shape-memory polymer, into touch input device to make it operable by light activation. Fundamental principle behind the aim is to convert mechanical property change of the light-induced shape-memory polymer activated by incidence light beam into a corresponding "touch-like" input detected by the touch input device. The light-induced shape-memory polymer may be employed in form of a uniform layer or a patterned layer. In operation, when a light beam of an activation wavelength incidences on the layer of LISMP, the polymer material of the layer, which is illuminated by the light beam, changes to a different crosslinking density upon process of photo-crosslinking or photo-cleaving induced by the light wavelength. The change of crosslinking density causes the portion of the layer, which is effectively illuminated by the light beam, having its volume either enlarged or reduced. The volume enlargement or reducing, in turn, makes the surface of the illuminated portion extend upward or retract downward respectively. Such surface movement of the illuminated portion may be detected by sensing mechanism of touch input device, Once detected with location of the illuminated portion, a valid input is established corresponding to the light activation of the light beam. Thus, this aim may get a light activated input panel operable by light beam emanated from a light pointer or a light pen or a light stylus. Due to its nature of approach, the aim may have the light activated input panel produced at cost comparable to touch input panel.

In accordance with the invention, one implementation approach of light activated input panel is to have a layer of light-induced shape-memory polymer (LISMP) incorporated in between of two electrode layers of a capacitive touch input device or capacitive touch panel. When the layer of LISMP is illuminated by activation lights of an incidence light beam, a localized volume change in the layer at illuminated region is generated due to light activation of LISMP material illuminated by the light. The localized volume change causes a localized capacitance variant between the two electrode layer corresponding to the illuminated region. Then, the localized capacitance variant may be detected with capacitive sensing means formed by the two electrode layers to determine its location, in turn, as position of light input activated by the light beam. For effectiveness of generating capacitance variation, the layer of light-induced shape-memory polymer may fill either fully or partially the in-between space of the two electrode layers. Furthermore, the layer of LISMP may be patterned to enhance its light activation performance for the purpose thereof. The localized volume change caused by light activation is normally relieved in transverse direction to show up as a surface movement of upward or downward at the illuminated region. If the layer of LISMP is patterned, it is possible to relieve the localized volume change caused by light activation in lateral direction, which may still generate adequate local capacitance variation for the detection. Light-induced shape-memory polymer may require to use a second wavelength light to restore the polymer to its original shape or volume after a localized volume change is caused by light activation. Therefore, a side light source may be placed at side of the layer of LISMP to send light of the second wavelength sideway into the in-between space of the two electrode layers to restore the localized volume change caused by previous light activation. For continueous operation, a light pulse of the second wavelength may be generated from the side light source to restore the layer of LISMP once a valid input of light activation is detected and processed to necessary extent that such restoration is permitted.

In accordance with the invention, another implementation approach of light activated input panel is to have a light activation panel comprising a layer of light-induced shape-memory polymer (LISMP) supported by a back plate attached to sensing surface of a touch input device or touch panel. When a light beam of activation wavelength incidences upon the layer of light-induced shape-memory polymer, region illuminated by the light beam has an effective volume change caused by the light activation. The effective volume change generates a local mechanical deformation on the sensing surface corresponding to the illuminated region. Similar as deformation caused by touching of finger or stylus, the local deformation is detected by sensing means of the touch panel to create a valid input corresponding to the light activation. In the approach, the touch panel may be a resistive touch panel or a capacitive touch panel. The light activation panel acts to convey incidence of light beam into mechanical deformation similar as "touching" of finger or stylus. The layer of light-induced shape-memory polymer may be patterned to enhance its light activation performance for the purpose hereof. A side light source of the second light wavelength for restoring light activated polymer may be placed to side of the layer of LISMP to send light of the second wavelength sideway into the layer of LISMP. For continuous operation, a light pulse of the second wavelength may be generated from the side light source to restore the layer of LISMP once a valid input is detected and processed to necessary extent that such restoration is permitted.

In accordance with the invention, another implementation approach of light activated input panel is to incorporate a light activation panel comprising a layer of light-induced shape-memory polymer (LISMP) supported by a back plate with a surface propagation sensing means to detect propagation obstruction across surface of the layer of LISMP. The surface propagation sensing means may be the same as or the like of the surface propagation sensing means used for touch input device or touch panel for detecting propagation obstruction caused by a finger or an input object such as a stylus. In the approach, the surface propagation sensing means is to detect propagation obstruction caused by bump or recess on the surface of the LISMP layer, which is caused by light activation of an incidence light beam. One example of the surface propagation means uses infrared light set forth from LEDs at one corner and camera or photo detector at the opposing corner. Another example of the surface propagation means uses acoustic wave set forth from transducer at one corner and microphone or acoustic receiver at the opposing corner. The layer of light-induced shape-memory polymer may be patterned to enhance its light activation performance for the purpose hereof. A side light source of the second light wavelength for restoring light activated polymer may be placed to side of the layer of LISMP to send light of the second wavelength sideway into the layer of LISMP. For continuous operation, a light pulse of the second wavelength may be generated from the side light source to restore the layer of LISMP once a valid input is detected and processed to necessary extent that such restoration is permitted.

Furthermore, in accordance with the invention, example designs regarding light pointing device, which is useful to operate the light activated input panel in accordance with the invention, are discussed in the disclosure. In accordance with the invention, several examples of application of the light activated input panel in accordance with the invention are also discussed in the disclosure.

In accordance with the invention, above description of summary is best effort to fulfill purpose or need of Brief Summary of Invention section and should not be used for purpose to reduce or be against merits of the invention as a whole. Furthermore, not to be limited by this summary section, all patentable rights embodied in or derived from the complete disclosure are reserved without prejudice.

BRIEF DESCRIPTION OF THE SEVERAL
VIEWS OF THE DRAWINGS

It should be understood that the brief description of the several views of the drawings is only for the purpose of presenting a concise reference to accompanying drawings and should not be inferred to have any suggestion to limit or reduce the scope of invention. Furthermore, the concepts and embodiments of the invention explicitly or implicitly shown in the drawings are only possibly understood accordingly by referring to following detailed descriptions upon illustrative showings of the drawings. For illustrative purpose, the drawings are not in scale. In the drawings:

FIG. 1 is a perspective drawing to illustratively show an example of an embodiment of the light activated input panel in accordance with the invention. The embodiment has a layer of light-induced shape-memory polymer (LISMP) disposed in between two electrode layers that form capacitive sensing means for input detection.

FIGS. 2A and 2B are cross-sectional drawings to illustratively show cross-sectional views of the example as illustratively shown in FIG. 1. In the cross-sectional view shown in the drawing of FIG. 2A, the layer of LISMP is made in form of continuous film. In the cross-sectional view shown in the drawing of FIG. 2B, the layer of LISMP is patterned.

FIGS. 3A, 3B and 3C are cross-sectional drawings to illustratively show light activation operations of the example as illustratively shown in FIG. 1, when an incidence light beam shed thereupon causes a localized volume change in the layer of LISMP. FIG. 3A illustrates a situation in which the localized volume change is a volume expansion. FIGS. 3B and 3C illustrate situations in which the localized volume change is a volume shrinkage.

FIGS. 4A and 4B are cross-sectional drawings to illustratively show light activation operation of the example as illustratively shown in FIG. 1, wherein localized volume change in the patterned layer of LISMP caused by light activation is relieved in lateral direction.

FIGS. 5A and 5B are cross-sectional drawings to illustratively show another example of the embodiment as mentioned above in the brief description of FIG. 1, in accordance with the invention. In the drawing of FIG. 5A, the layer of LISMP is made in form of continuous film. In the drawing of FIG. 5B, the layer of LISMP is patterned.

FIGS. 6A and 6B are cross-sectional drawings to illustratively show light activation operations of the example as illustratively shown in FIGS. 5A and 5B, when an incidence light beam shed thereupon causes a localized volume change in the layer of LISMP. FIG. 6A illustrates a situation in which the localized volume change is a volume expansion. FIG. 6B illustrates a situation in which the localized volume change is a volume shrinkage.

FIG. 7 is a cross-sectional drawing to illustratively show an example of another embodiment of the light activated input panel in accordance with the invention. The embodiment has a light activation panel attached with a touch input panel. The light activation panel comprises a layer of light-induced shape-memory polymer (LISMP) and a back plate having the layer of LISMP attached therewith.

FIGS. 8A and 8B are cross-sectional drawings to illustratively show light activation operations of the example as illustratively shown in FIG. 7, when an incidence light beam shed thereupon causes a localized volume change in the layer of LISMP. FIG. 8A illustrates a situation in which the localized volume change is a volume shrinkage. FIG. 8B illustrates a situation in which the localized volume change is a volume expansion.

FIG. 9 is a schematic in normal direction view to illustrate an example configuration of the patterned electrode layers for capacitive or resistive sensing means, which may be useful for the embodiments in accordance with the invention.

FIG. 10A is a cross-sectional drawing to illustratively show an example of another embodiment of the light activated input panel in accordance with the invention. The embodiment has a light activation panel, comprising a layer of light-induced shape-memory polymer (LISMP) and a back plate having the layer of LISMP attached therewith, and a surface propagation sensing means incorporated together. FIG. 10B is a cross-sectional drawing to illustratively show light activation operation of the example, when an incidence light beam shed thereupon causes a localized volume expansion in the layer of LISMP.

Figure 14:
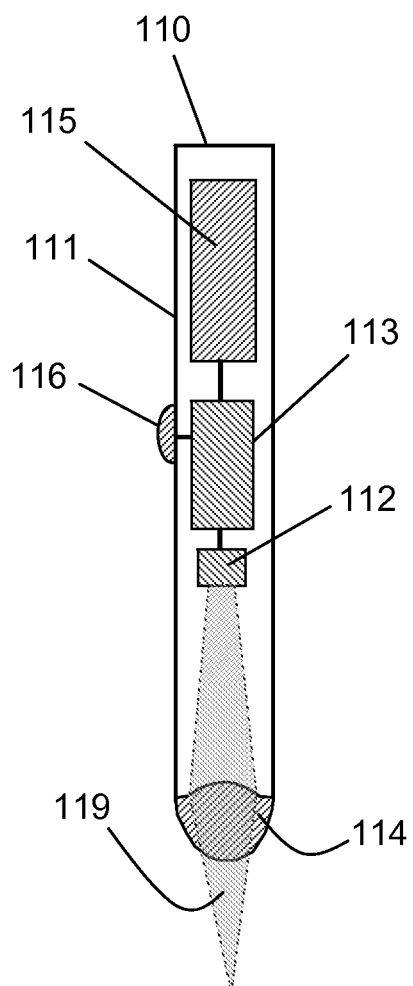

FIG. 14 illustratively gives an example design for light pen or light stylus or light pointer, which may be useful to operate the light activated input panel in accordance with the invention.

Figure 15:
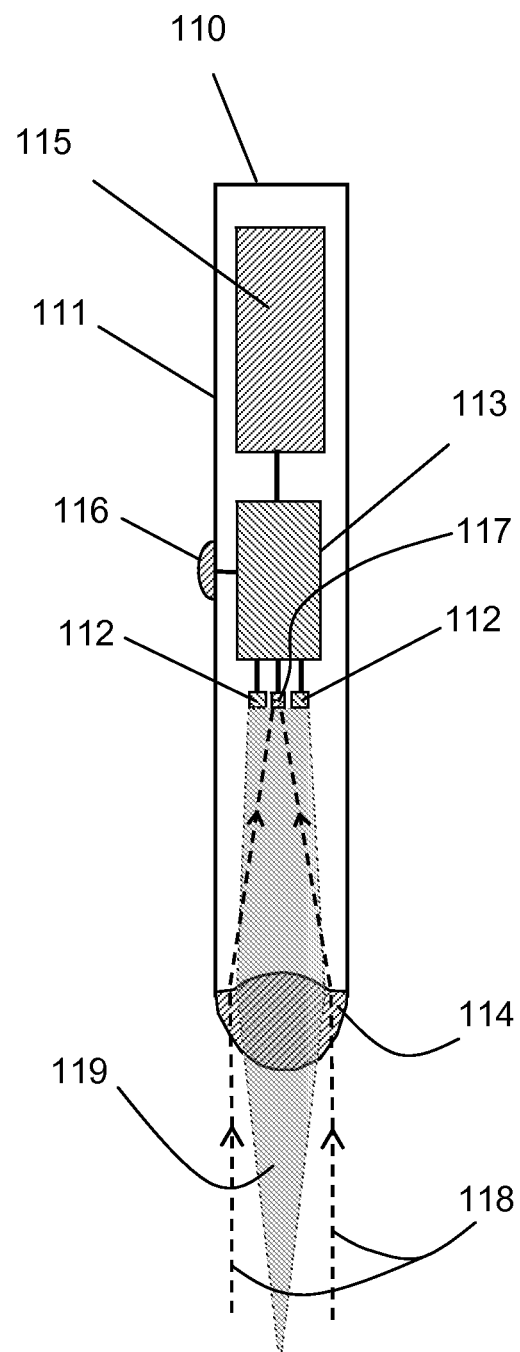

FIG. 15 illustratively gives an example design for light pen or light stylus or light pointer having a photosensor for interlock means of disabling light output if not pointed at desired surface, which may be useful to operate the light activated input panel in accordance with the invention.

Figure 16:
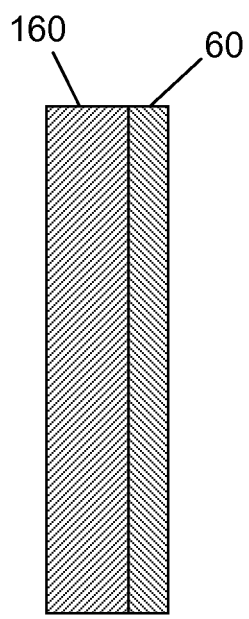

FIG. 16 is a cross-sectional drawing to illustratively show an example of application of the light activated input panel, which has a flat panel display and a light activated input panel in accordance with the invention attached together.

Figure 17:
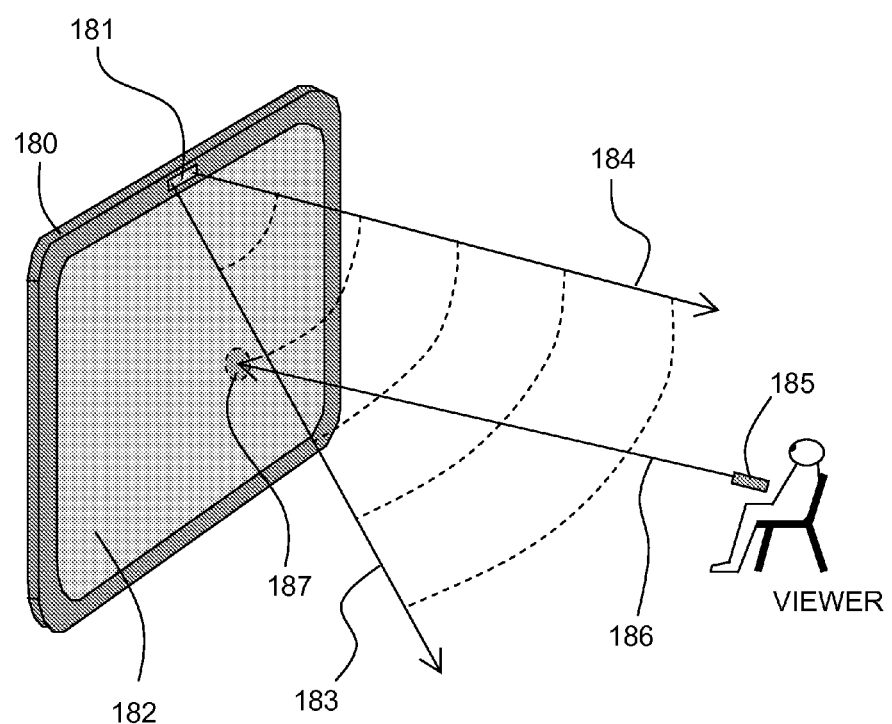

FIG. 17 illustrates user scenario of a flat panel TV with light activated input capability, which embodies the example of application as illustratively shown in FIG. 16.

Figure 18:
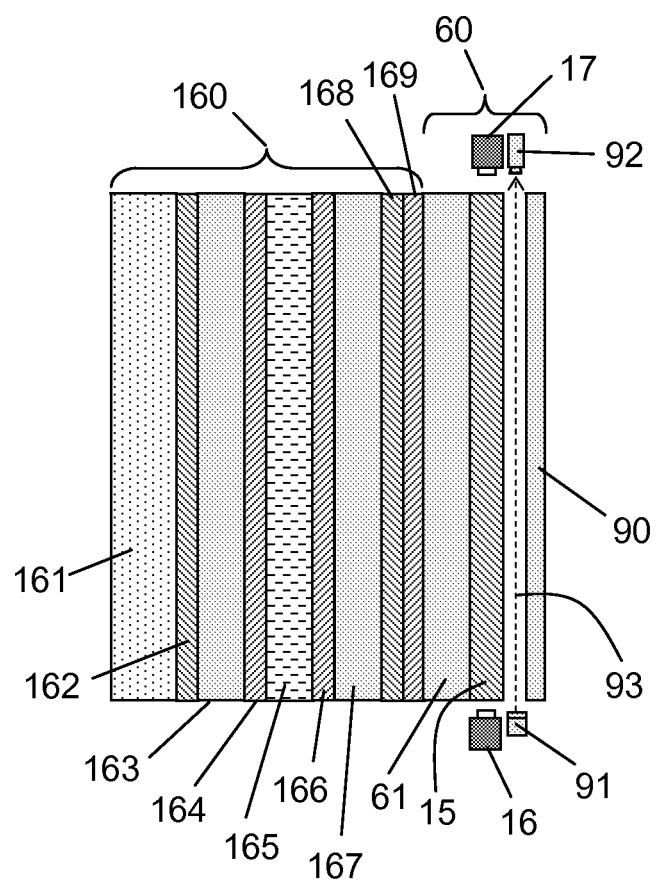

FIG. 18 is a cross-sectional drawing to illustratively give a detailed structure of the example of application as illustratively shown in FIG. 16, using liquid crystal display and the light activated input panel based on surface propagation sensing means.

DETAILED DESCRIPTION

Light-induced shape-memory polymer (LISMP) generally relies on processes of photo-crosslinking and photo-cleaving to reversibly switch its crosslinking status between a low-crosslinking density and a high-crosslinking density. Light of a first wavelength is used for initiating process of photo-crosslinking to cause molecular chains of the polymer to form highly crosslinked network, thus changing density of the polymer from the low-crosslinking density to the high-crosslinking density. Light of a second wavelength is used to initiating process of photo-cleaving, which breaks crosslinked bonds between molecular chains, to change density of the polymer from the high-crosslinking density to the low-crosslinking density. Accompanying the density switching, the polymer has its volume or shape alternated between two corresponding states. It is common that the wavelengths for process of photo-crosslinking and process of photo-cleaving are within Ultra-violet (UV) band of light spectrum. For example, light-induced shape-memory polymer containing cinnamic groups may be set to one predetermined volume or shape by UV light illumination of wavelength larger than 260 nm and then recover to the original volume or shape when exposed to UV light of wavelength less than 260 nm. In this example, the wavelength for photo-crosslinking process is in UV spectrum range from 260 nm to above (longer), which is primarily Ultraviolet B (medium wave band) and Ultraviolet A (long wave band), and, the wavelength for photo-cleaving process is in UV spectrum range from 260 nm to below (shorter), which is within Ultraviolet C (short wave band). The wavelengths are available for LED (light emitting diode) light sources. For example, Aluminum nitride LED with wavelength of 210 nm had been reported to be made and its related article was published in Nature 441, 325-328 (18 May 2006) by Yoshitaka Taniyasu et al. Thus, due to compactness of LEDs, miniature UV light source based on LEDs is readily available to meet the needs hereof. Light-induced shape-memory polymer containing cinnamic groups may be formed by any suitable approach. For example, one such approach forms a polymer having grafted cinnamic group, where a cinnamic acid (CA) is grafted onto the polymer. Such grafted polymers may be obtained by copolymerization of n-butylacrylate (BA), hydroxyethyl methacrylate (HEMA) and ethyleneglycol-1-acrylate-2-CA (HEA-CA) with poly(propylene glycol)-dimethacrylate as crosslinker. Alternatively, another suitable approach for creating the polymer containing a cinnamic group includes forming a permanent network of the polymer from BA with 3.0 wt % poly(propylene glycol)-dimethacrylate as crosslinker. It is to be understood that the above examples are provided as nonlimiting examples, and any suitable light-induced shape-memory polymer may be used without departing from the spirit of this disclosure.

In accordance with the invention, one embodiment for the light activated input panel comprises two electrode layers respectively laid on two plates and separated by a predetermined gap and a layer of light-induced shape-memory polymer (LISMP) in between of the two electrode layers. The two electrode layers form capacitive sensing means commonly used for touch input device or touch panel, which detects local capacitance change to determine location of input. The layer of LISMP transforms light illumination of an incidence light beam into localized capacitance variation through localized volume change of light-induced shape-memory polymer activated by the light illumination, which, in turn, is detected as a valid input by the capacitive sensing means formed by the two electrode layers. In operation, the incidence beam is normally generated and sent upon by a light stylus or light pen or a light pointer. Wavelength of the incidence light beam, which is also referred as activation wavelength in this disclosure, may be either the wavelength for initiating process of photo-crosslinking or the wavelength for initiating process of photo-cleaving. After a light activated input caused by the incidence light beam is detected, the localized volume change must be restored to original shape in time in order to permit next input to be accurately detected. A mechanism of side light exposure may be implemented in light activated input panel to expose the layer of LISMP sideway with lights of a different wavelength, referred as restoration wavelength in this disclosure, to restore the layer of LISMP. The restoration wavelength may be either the wavelength for initiating process of photo-crosslinking or the wavelength for initiating process of photo-cleaving, but other than the activation wavelength. For example, if the activation wavelength is the wavelength for initiating process of photo-crosslinking, the restoration wavelength is the wavelength for initiating process of photo-cleaving. Or, if the activation wavelength is the wavelength for initiating process of photo-cleaving, the restoration wavelength is the wavelength for initiating process of photo-crosslinking. The mechanism of side light exposure may take form of placing a side light source of the restoration wavelength next to side of the layer of LISMP to send light laterally through the layer for exposure. The side exposure light may be turned on only for a short time duration sufficient to restore any localized volume change in the layer previously caused by a light activated input. In the time duration, the side exposure light may be generated in form of pulses. Diffusion equation may be used to simulate light distribution along lateral length of the layer for side light exposure to help determine the time duration. Alternatively, a real-time exposure monitoring mechanism may be used to determine in real time whether the time duration, which effectively corresponds to overall exposure dose, is long enough to restored the localized volume change. The real-time exposure monitoring mechanism uses the sensing means of the input panel to determine whether a previously detected localized capacitance variation has disappeared, which in turn indicates whether corresponding localized volume change has been restored. In an example of implementation, the side exposure light may be kept on until control of the input panel finds out that a previously detected localized capacitance variation has disappeared. A certain level of over exposure may be necessary to ensure the layer of LISMP completely restored. For capacitive sensing means supporting multi touch inputs, the restoration may be performed not following every time having light activated input but periodically following a time duration of using or a number of light activated inputs. For purpose of accurate detection, it is preferred to have the restoration performed instantaneously after a light activated input is detected and processed to necessary extent such that the restoration has no detrimental effect on the detection and processing of the input. By performing restoration exposure laterally through the layer of LISMP in sideway, lights for the exposure is prevented from going outside so that it has no detrimental effect to ambient environment or user. In addition to that, if the light activated input panel is to be placed on top of a flat panel display, it will not affect visual effect of the displayed images and impair viewer's viewing experience. In the embodiment, the layer of LISMP may occupy whole or partial distance of the predetermined gap between the two electrode layers. The predetermined gap is primarily determined by desired performance of the capacitance sensing means and may be further optimized by considering presence of the layer of LISMP and, if applicable, requirement of the side light exposure for restoration.

Figure 1:
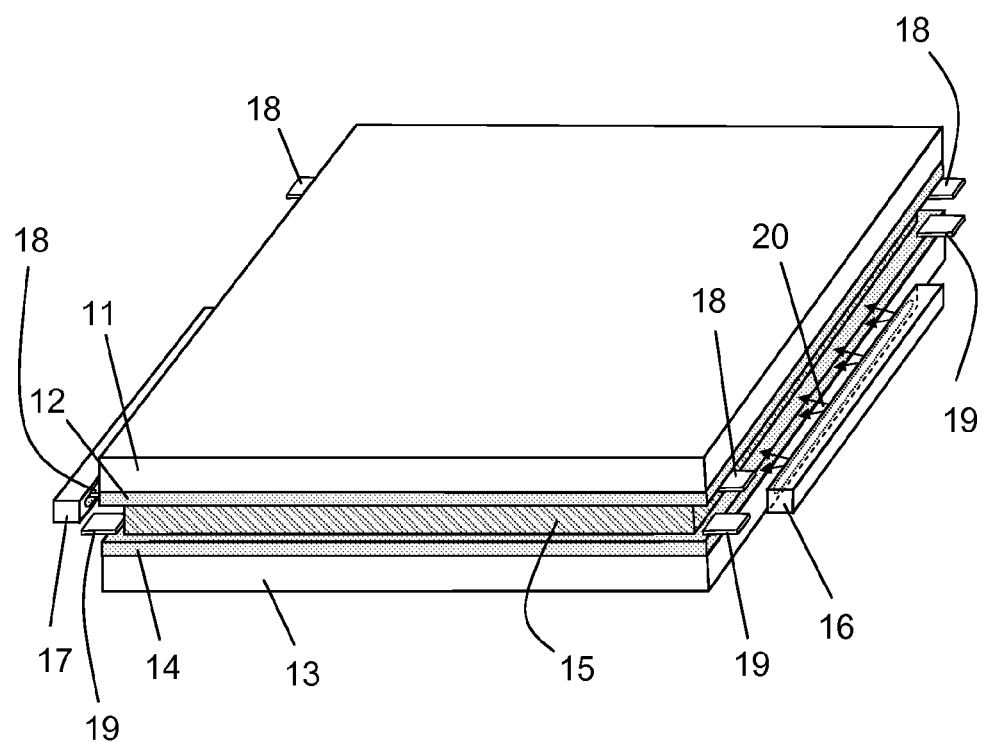

An example of the embodiment, illustratively shown by the perspective drawing of FIG. 1, has a top plate 11 disposed opposing a bottom plate 13 with a predetermined gap in between. Respectively, top place 11 and bottom plate 13 have an electrode layer 12 and an electrode layer 14 on their side surfaces opposing each other. A layer 15 of light-induced shape-memory polymer (LISMP) is sandwiched by plates 11 and 13, in between of electrode layer 12 and 14. In order for activation light to pass through, plate 11 or 13 may be made of transparent material such as glass, quartz, optical clear polymer, or the similar, and, electrode layer 12 or 14 may be made of transparent conductive material such as ITO (indium-tin-oxide) or the like, carbon nanotube, graphene, conductive polymer, or, patterned metal layer. A side light source 16 is placed beside one side of the two plates and vertically between the two plates, such that lights 20 outputted by the side light source may go into intermediate space between the two plates. In operation, side light source 16 outputting lights 20 of the restoration wavelength is used to expose layer 15 of LISMP for side exposure restoration. To facilitate more uniform side exposure, a second side light source 17 outputting lights of the restoration wavelength may be placed in similar way as side light source 16, but beside the opposite side of the two plates. In operation, the lights from light source 16 and 17 may go into layer 15 from two opposing directions, thus producing more uniform light intensity distribution across layer 15. With assistance of the second side light source or more side light sources, time duration taken for side exposure restoration can be reduced to make the input panel more timely responsive. For effectiveness, the side light source may be in bar or stripe shape arranged parallel to side edge of the plates. One example of the side light source is a LED light stripe comprising a plurality of LEDs distributed in a row or multi rows. Another example of the side light source is a tubular lamp for desired wavelength optionally installed in a reflective bar-shape housing. Two electrode layer 11 and 13 forms a capacitive sensing means to detect any localized capacitance variation between the two electrode layers. Any capacitive sensing means useful for touch input device such as touch panel, digitizer, touch pad or the like may be implemented here accordingly and the electrode layers should be made and configured accordingly in conformance to characteristics and needs of the capacitive sensing means implemented. One example of capacitive sensing means is illustratively shown in the drawing, which has four contact terminals electrically connected to the each electrode layer on four corners of the each plate respectively. In showing of the drawing, four contact terminals 18 are respectively made at four corners of electrode layer 12 and electrically connected thereto. Four contact terminals 19 are respectively made at four corners of electrode layer 14 and electrically connected thereto. In this example of capacitive sensing means, the electrode layers are continuous conductive films deposited on side surfaces of the plates. Control circuit (not shown) are connected to the contact terminals to obtain four corner-measured capacitances between the two electrode layers through the corresponding sets of the contact terminals. Then, a sophisticated but already well developed algorism based on relations among these four corner-measured capacitances is used to determine location of localized capacitance variation, which had been widely implemented in many touch input devices. The example of capacitive sensing means has low cost to make, but, due to limitation of the positioning algorism, is less accurate in positioning accuracy and incapable of detecting simultaneous multi inputs. Other capacitive sensing means capable of more accurate positioning of input or detection of simultaneous multi inputs may be implemented accordingly as obvious variant of the example under enlightenment of the teaching spirits disclosed in this disclosure.

Figure 2A:
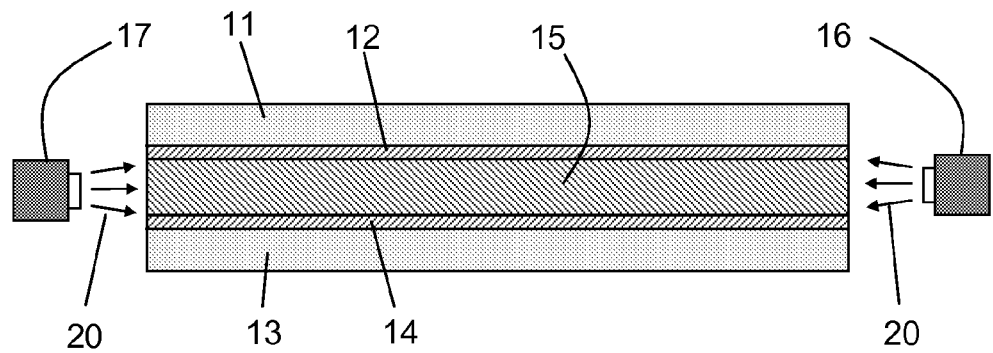
Figure 2B:
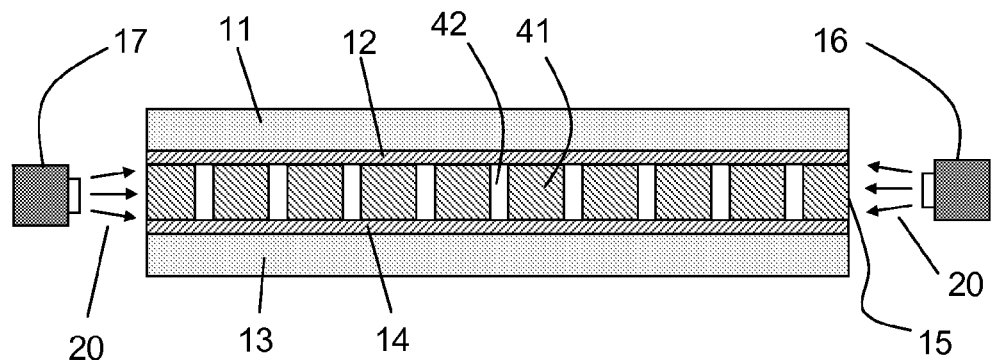

Layer 15 of light-induced shape-memory polymer (LISMP) may be a continuous film of the polymer materials, as illustratively shown in cross-sectional drawing of FIG. 2A. Any applicable film deposition way, for example, thermal vapor deposition, chemical vapor deposition, e-beam evaporation, sputtering, spinning-on, dipping, spraying, brushing, or, film-bonding, may be used to apply the film of the LISMP providing the way is compatible with chemical handling procedure of the LISMP material. In the drawing, layer 15 is continuous in lateral dimension to effectively cover input sensing area and fulfills the gap between electrode layer 12 and 14 in transversal dimension. Side light source 16 and 17 respectively locate on two opposite sides of layer 15 of LISMP. When needed in operation, lights 20 generated by light source 16 and 17 go into intermediate space between the plates for restoration exposure of layer 15. A light guidance scheme (not shown) may be used to improving efficiency of coupling lights 20 into layer 15. It is to be recognized that the interface between layer 15 and electrode layer 12 or 14 may be loosely contacted or strongly bonded, depending upon needs of overall design of the light activated input panel. Alternatively, layer 15 of LISMP may be made to form certain patterns such as isolated islands, as illustratively shown in cross-sectional drawing of FIG. 2B. Any applicable patterning way, for example, photolithography and etching (wet etching or dry etching) or the like, mechanical cutting, laser cutting, water jet cutting, shadow-mask-deposition and etching, or the similar techniques, may be used to pattern the layer of LISMP providing the patterning way is compatible with chemical handling procedure of the LISMP polymer. In the drawing, layer 15 is patterned to have material portions 41 of the LISMP material and spacing portions 41 intermixing one another. Material portions 41 may be either surrounded by adjacent spacing portions 41 to form isolated islands or partially separated one adjacent another by adjacent spacing portions 41. By patterning the layer of LISMP, internal stress accompanying localized volume change caused by light activation may be confined laterally within the involved material portions according to configuration of patterns of the layer, thus better controlled to optimally effectuate responsiveness of light activated input panel. Furthermore, it is possible to have the material portions primarily extending laterally into the adjacent spacing portions in response to volume expansion caused by light activation, or, primarily retracting laterally to enlarge the adjacent spacing portions in response to volume shrinkage caused by light activation. Such laterally expanded or retracted volume change can also effectively generate localized capacitance variation for the capacitive sensing means implemented herewith to detect. Therefore, by having different patterns made thereon, patterned layer 15 of LISMP may be configured to response to light activation with volume change primarily along either transverse direction or lateral direction or along both transverse and lateral directions. Once mechanical properties of LISMP material are characterized, how to determine the pattern configuration for desired direction of volume change is within normal work practice and art skills of ordinal skilled personnel in mechanical engineering. For example, when support plates holding the layer of LISMP are rigid, it is more difficult for the material portions to expand transversely but easier to expand laterally providing the adjacent spacing portions sufficiently accommodate the lateral expansion. By considering mechanical strengths of support plates holding the layer of LISMP and properties of LISMP material, varying dimensions and relative ratio of the material portions and the spacing portions may guide the volume expansion primarily along different directions.

Figure 3A:
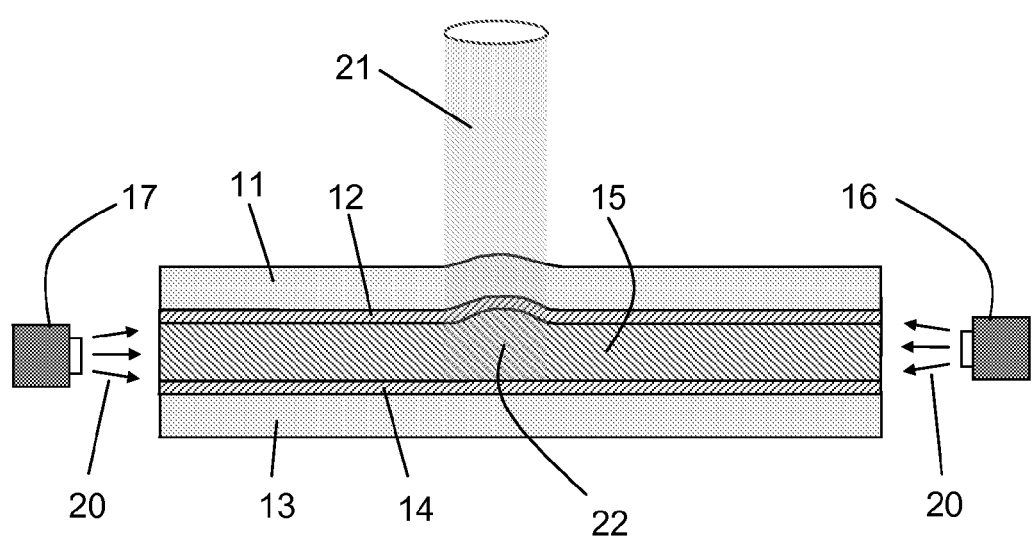
Figure 3B:
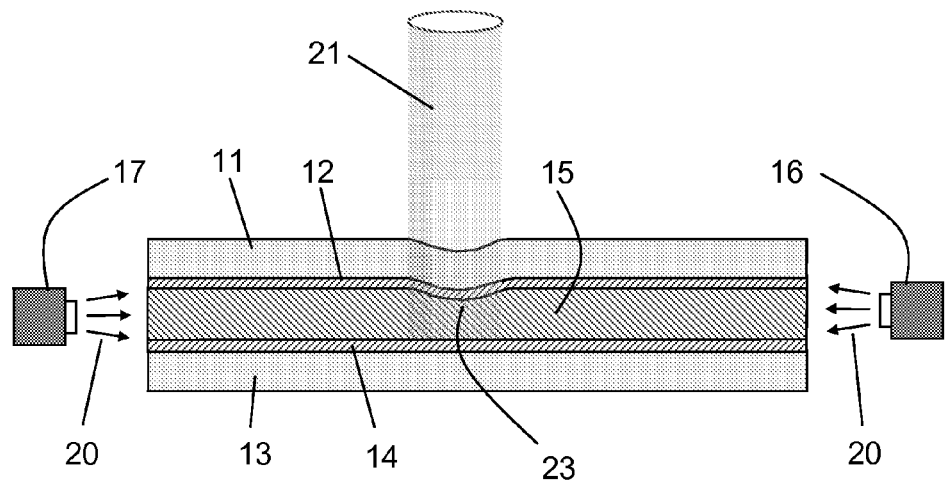
Figure 3C:
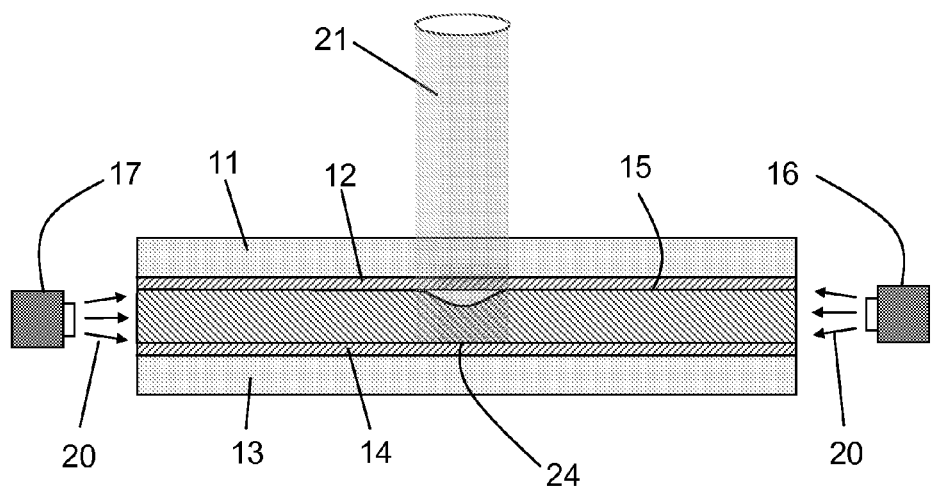

In operation, a light beam of activation wavelength sheds upon the light activated input panel disclosed herein may cause the portion of layer 15 effectively activated by lights of the light beam experiencing either a volume expansion or a volume shrinkage depending upon which process of either photo-crosslinking or photo-cleaving is initiated thereby. If layer 15 of LISMP is continuous film of the LISMP material, the localized volume change activated by the light beam is primarily relieved in transverse direction due to extremely hard for the continuous film to expand or retract in lateral direction. As illustratively shown by cross-sectional drawing of FIG. 3A, a localized volume expansion 22 caused by an activation light beam 21 results in a "bump-like" deformation on plate 11, which produces a localized capacitance variant between electrode layers 12 and 14 corresponding to the deformation. In order to get rid of deformation resistance of external atmosphere pressure, the interface between layer 15 and electrode layer 12 should be permeated with air from ambient to counterbalance ambient atmosphere pressure. This can be achieved by a variety of ways, for example, having surface grooves made on layer 15 extending to edge connected to ambient air, or, having the interface loosely contacted to permit ambient air to enter through edge. As illustratively shown by cross-sectional drawing of FIG. 3B, a localized volume shrinkage 23 caused by activation light beam 21 results in a "dent-like" deformation on plate 11, which produces a localized capacitance variant between electrode layers 12 and 14 corresponding to the deformation. In this situation, external atmosphere pressure is taken advantage to assist locally bending the plate to form the "dent-like" deformation. To do that, the interface between layer 15 and electrode layer 12 should be kept sealed from ambient air. This may be realized by tightly bonding layer 15 with electrode layer 12. As illustratively shown by cross-sectional drawing of FIG. 3C, a localized volume shrinkage 23 caused by activation light beam 21 results in a recess on top surface of layer 15, which also produces a localized capacitance variant between electrode layers 12 and 14 corresponding to the recess due to dielectric constant difference between the LISMP material and air. In this situation, air from ambient air should be permitted to easily go into the interface between layer 15 and electrode layer 12 in order to form the recess without obviously bending the plate above. This may be realized by either loosely attaching layer 15 with electrode layer 12 to allow air entering through edge or making surface grooves on layer 15 connected to edge for air passage. It is emphasized again that side light exposure by side light source 16 or 17 or both of them with restoration wavelength may be performed to restore layer 15 once the localized capacitance variant mentioned above is effectively detected and processed to necessary extent to allow such restoration.

Figure 4A:
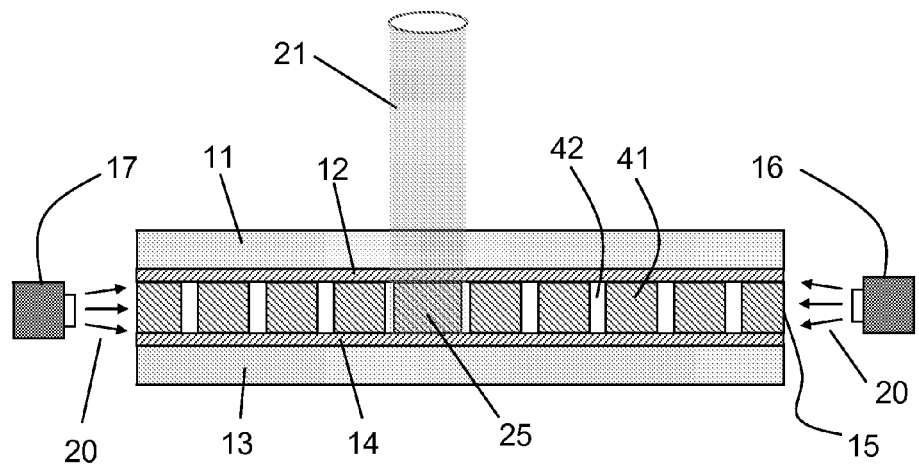
Figure 4B:
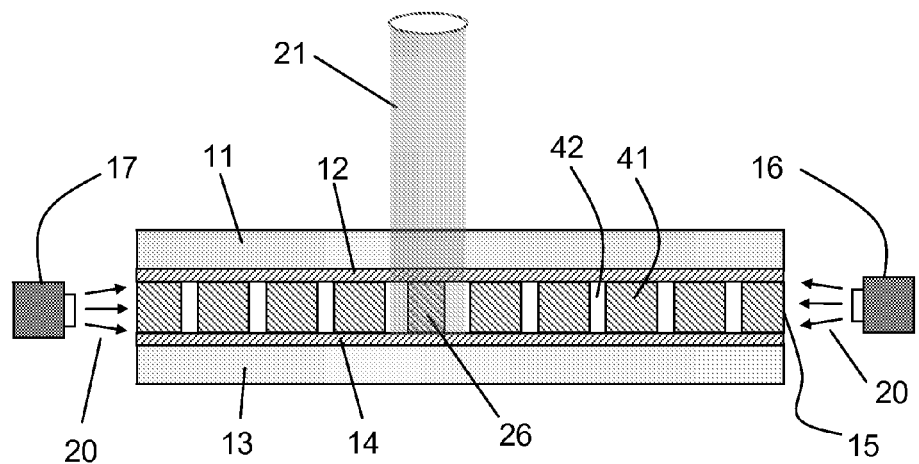

As already discussed previously in this disclosure, for patterned layer 15 of LISMP, localized volume change activated by the light beam may be relieved in transverse direction or lateral direction. If patterned layer 15 is configured to relieve the volume change in transverse direction, above examples for continuous film are equally applicable for patterned layer in view of the teaching spirits disclosed thereof. If patterned layer 15 is configured to relieve the volume change in lateral direction, having spacing portions 42 intermixing among material portions 41 gives much freedom for such volume change in lateral direction. As illustratively shown by cross-sectional drawing of FIG. 4A, a material portion 25 under exposure by activation light beam 21 expands its lateral dimension to reduce its adjacent spacing portions, which produces a localized capacitance variant between electrode layers 12 and 14 corresponding to the expansion. As illustratively shown by cross-sectional drawing of FIG. 4B, a material portion 26 under exposure by activation light beam 21 retracts its lateral dimension to enlarge its adjacent spacing portions, which also produces a localized capacitance variant between electrode layers 12 and 14 corresponding to the retraction. Only for illustration purpose, drawings of FIGS. 4A and 4B show one material portion exposed by the activation light beam, which should not be understood to have any suggestion or hint that only one material portion is to be exposed by activation light beam. In reality, activation light beam may expose more than one material portions for creating corresponding localized capacitance variant. It is preferred to have material portions generally made much smaller than beam size of activation light beam in order to have a larger number of material portions under exposed by the beam, thus rendering an averaging effect on localized capacitance variant to reduce fluctuation for more reliable detection of the light activated input. It is emphasized again that side light exposure with restoration wavelength by side light source 16 or 17 or both of them is to restore the expanded or retracted material portion or portions back to original lateral dimension or dimensions.

Figure 5A:
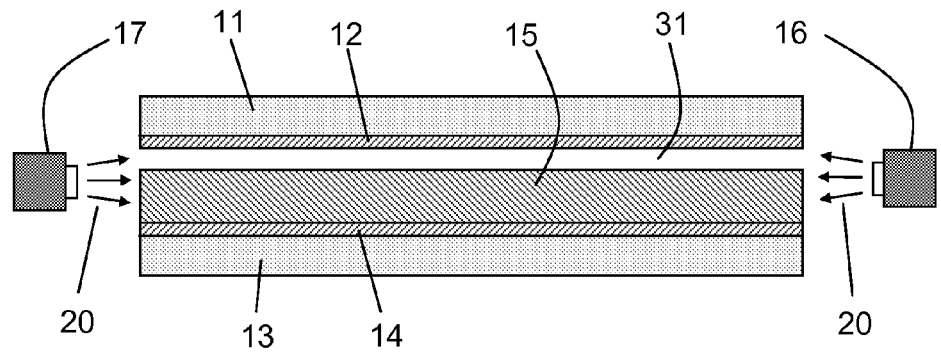
Figure 5B:
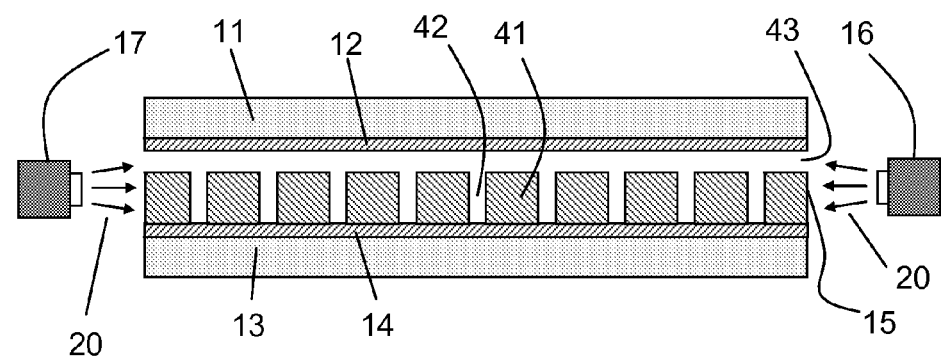
Figure 6A:
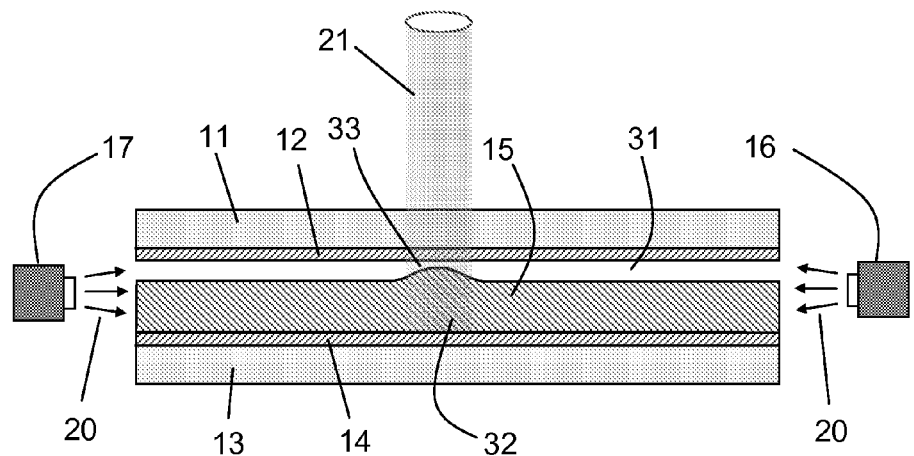
Figure 6B:
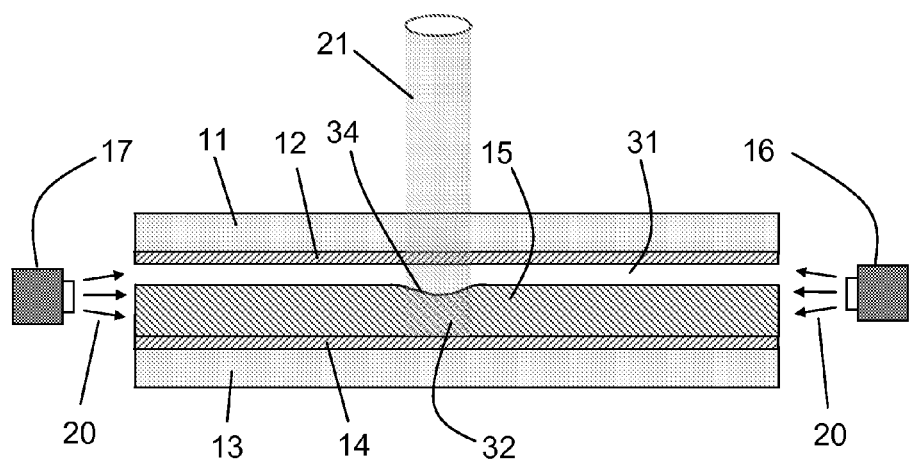

Another example of the embodiment has layer 15 of light-induced shape-memory polymer (LISMP) partially occupying the predetermined gap between two electrode layers 12 and 14, as illustratively shown by cross-sectional drawing of FIG. 5A. In the drawing, layer 15 has its bottom surface attached with electrode layer 14 and a gap 31 is present between its top surface and electrode layer 12. Because of dielectric constant difference between the LISMP material and air in the gap, any applicable capacitive sensing means formed by electrode layers 12 and 14 is still operable for intended purpose the same as the above. With presence of gap 31, it is advantageous for localized volume change in layer 15 of LISMP activated by activation light beam to be relieved freely in transverse direction due to upper space freedom provided by the gap. As illustratively shown in cross-sectional drawing of FIG. 6A, a localized volume expansion 32 induced by activation light beam 21 results a bump on top surface of layer 15, which in turn creates a localized capacitance variant corresponding to the volume expansion. As illustratively shown in cross-sectional drawing of FIG. 6A, a localized volume shrinkage 32 induced by activation light beam 21 results a recess on top surface of layer 15, which in turn creates a localized capacitance variant corresponding to the volume shrinkage. Furthermore, as illustratively shown in cross-sectional drawing of FIG. 5B, layer 15 of LISMP may be patterned to have material portions 41 and spacing portion 42 intermixing one another, similar as disclosed previously in the disclosure. It is to be understood that all teachings in the previous example of the embodiment, if applicable by view of ordinary skilled personnel under enlightenment of spirits of the teachings in the disclosure, are useful for this example unless otherwise manifestly stated, and, are not to be reiterated again for purpose of avoiding redundant descriptions on the same or the similar issues. This example of the embodiment may also be operable by physical touch because gap 31 permits top plate 11 to be deformed with light force applied by physical touch, which, in turn, generates a localized capacitance variant detectable by the capacitive sensing means formed by two electrode layers 12 and 14. Thus, it may be operated by light activation caused by a activation light beam or physical touch applied by a stylus or a finger. The light activated input panel useful for both light activated application and physical touch application may be constructed upon enlightenments of the teaching spirits of this example of the embodiment. In this case, the sensing means may not tell whether an input comes from light activation or physical touch. To ensure proper operation, side restoration exposure may be performed following each time detection of an input regardless whether the input is caused by light activation or physical touch.

Figure 7:
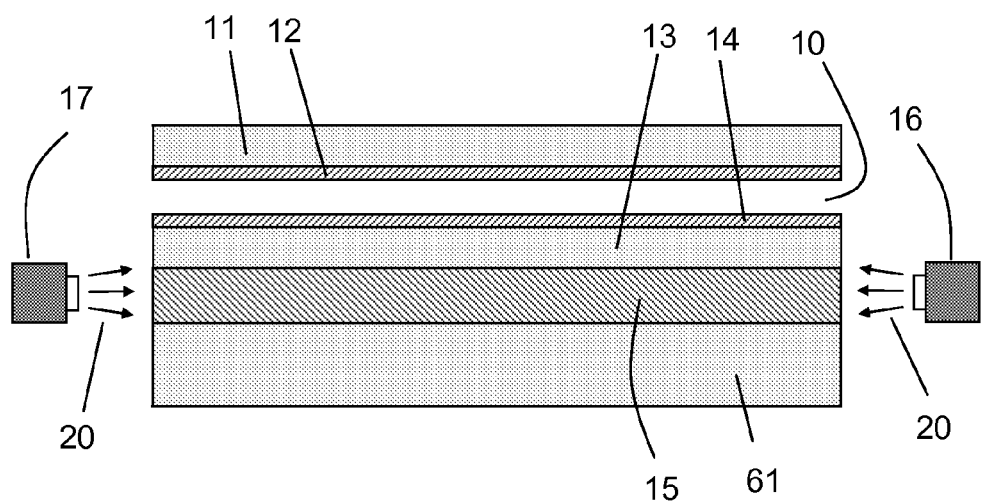

In accordance with the invention, another embodiment for the light activated input panel has a light activation panel, which comprises a layer of light-induced shape-memory polymer (LISMP) and a back plate having the layer of LISMP attached thereupon, attached with a touch input panel such that a localized volume change on the layer of LISMP caused by light activation is conveyed to produce a corresponding deformation on sensing surface of the touch input panel for detection by the same. The basic idea behind approach of the embodiment is to take the localized volume change to make a "touch-like" input on the touch input panel, just like a finger or stylus touch. The embodiment is understood better and more easily by referring to an example of the embodiment, which is illustratively shown by cross-sectional drawing of FIG. 7. In the drawing, the light activation panel is formed by layer 15 of LISMP and a back plate 61. Layer 15 is laid on and supported by back plate 61. The touch input panel is formed by electrode layers 12 and 14 opposing each other with a predetermined gap 10 in between, which are supported by top plate 11 and bottom plate 13 respectively. Electrode layer 12 and 14 form sensing means of the touch input panel, which may be either resistive sensing means or capacitive sensing means in this example of the embodiment. It is recognized by related art field that resistive sensing means normally detects location of a contact formed between the two electrode layers and capacitive sensing means detects location of localized capacitance variant between the two electrode layers. It is within normal working practice of ordinary skilled personnel in related art field to implement the sensing means upon the electrode layers in details. Sensing surface of the touch input panel of this example is bottom surface of plate 13, to which layer 15 of LISMP is attached. Back plate 61 may be sufficiently rigid so that any localized volume change on layer 15 caused by light activation is substantially relieved in transversely upward direction, thus maximizing effect on deforming bottom plate 13 of the touch input panel. The surface of layer 15 of LISMP in contact with back plate 61 is referred as back surface and the other surface of layer 15 is referred as front surface, since any traverse surface movement caused by light activation occurs on the other surface or the front surface. Similar as disclosed above in this disclosure, side light source 16 or 17 is used to restore any localized volume change on layer 15 through side exposure by lights 20 of restoration wavelength for the LISMP material. The example may have top surface of plate 11 configured as front surface of the light activated input panel, on which, in operation, activation light is applied from above. In this case, plate 11, plate 13, electrode layer 12 and electrode layer 13 should be made of materials transparent to activation light. Furthermore in this case, top plate 11 may be deformed by physical touch applied thereon to trigger a valid input detection. Thus, the example may permit physical touch input in conjunction with light activation input. Alternatively, the example may have bottom surface of back plate 61 configured as front surface of the light activated input panel, on which, in operation, activation light is applied from underneath. In this case, plate 61 should be made of material transparent to activation light.

Figure 8A:
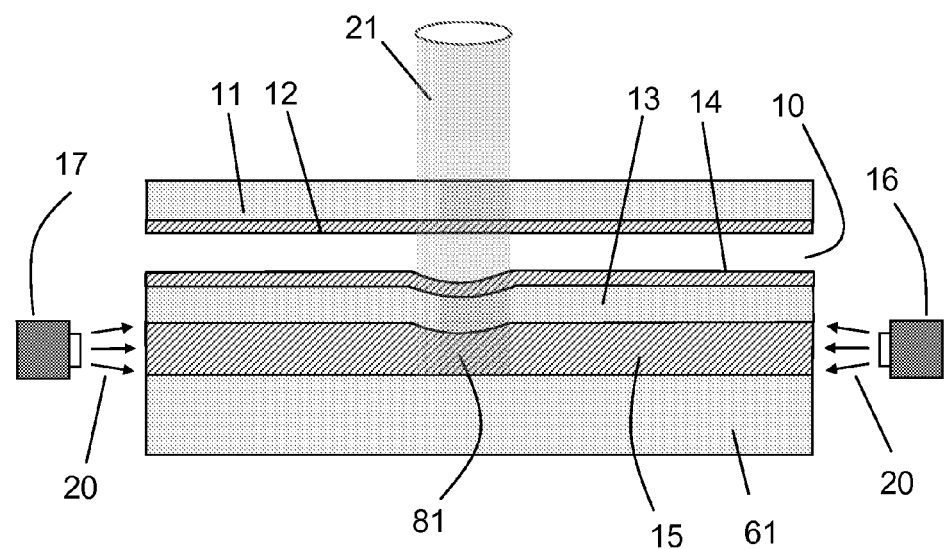
Figure 8B:
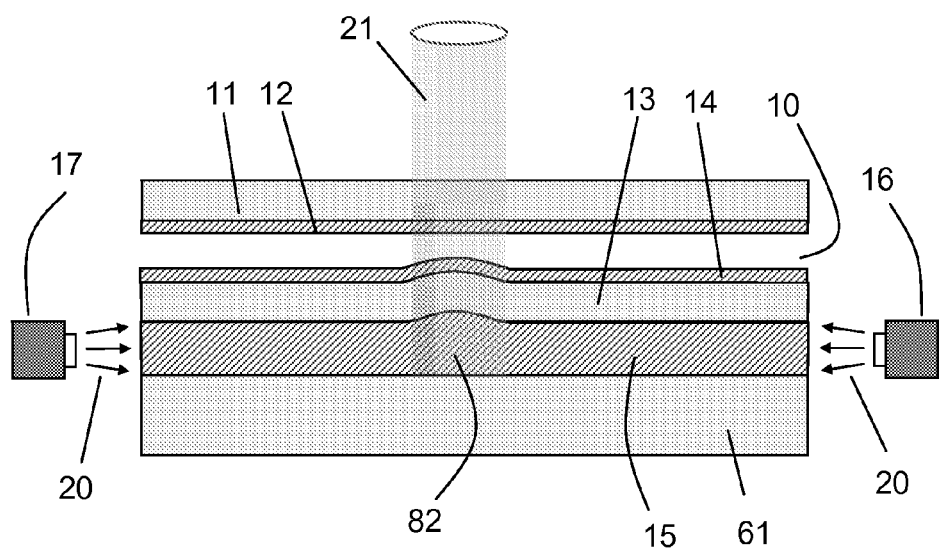

In operation, activation light may cause portion of layer 15 of LISMP) under exposure having either a volume expansion or a volume shrinkage depending upon which switching wavelength of the LISMP material is chosen as activation wavelength. As illustratively shown by cross-sectional drawing of FIG. 8A, a portion 81 on layer 15 under exposure by activation light beam 21 experiences a volume shrinkage. The volume shrinkage, in turn, results a dent-like deformation on bottom plate 13 and electrode layer 14 as well. The deformation is to be detected by the sensing means formed by two electrode layers 12 and 14 to report a light activated input on the input panel. In this situation, atmosphere pressure normally present in gap 10 may facilitate formation of the deformation to follow underneath volume shrinkage. Thus, it is preferred to have layer 15 of LISMP firmly bonded with bottom plate 13. Because it is impossible for the dent-like deformation to form electrical contact between the two electrode layers, resistive sensing means is not usable for this situation. Instead, capacitive sensing mean should be used and capable of detecting the localized capacitance variant accompanying the deformation. As illustratively shown by cross-sectional drawing of FIG. 8B, a portion 82 on layer 15 under exposure by activation light beam 21 experiences a volume expansion, which, in turn, results a bump-like deformation on bottom plate 13 and electrode layer 14 as well. Then, the deformation is detected by the sensing means formed by two electrode layers 12 and 14 to report a light activated input on the input panel. In this situation, to facilitate formation of the bump-like deformation, the interface between layer 15 and bottom plate 13 should be pressure-balanced with inner space of gap 10, which is normally in atmosphere pressure. Thus, it is preferred to have the interface connected to ambient air through any applicable way, for example, making a loose contact between layer 15 and plate 13, or, making surface grooves on layer 15 extending to edge for air leakage. Because resistive sensing means requires electrical contact formed between the two electrode layers, the deformation caused by light activation should be larger enough to form the electrical contact if resistive sensing means is in use for detection. Therefore, for the reason, capacitive sensing means is expected to be more sensitive to deformation detection, thus preferred to resistive sensing means here in this situation.

Figure 9:
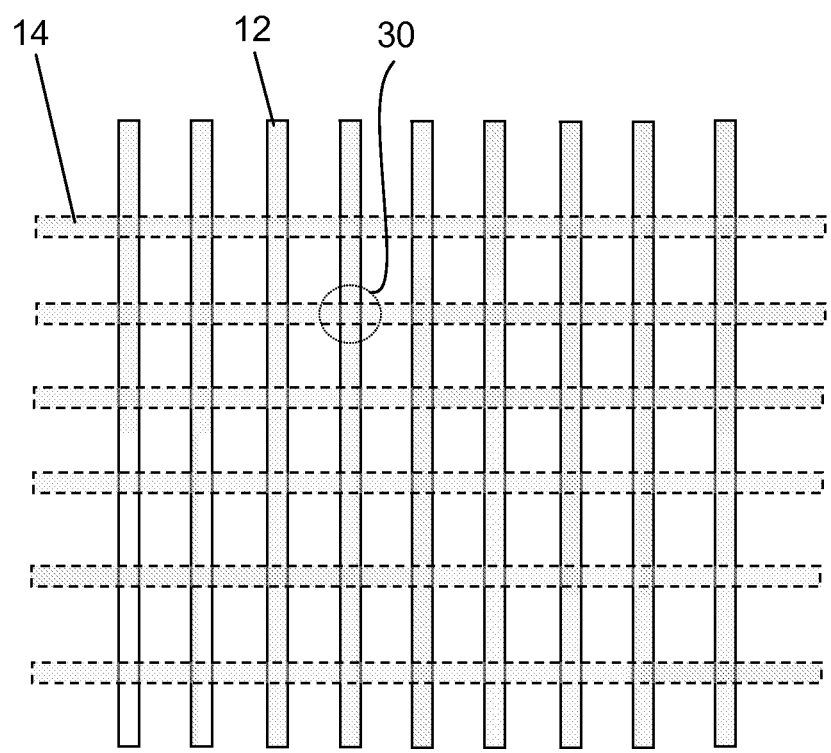

In all above examples of the above two embodiments, electrode layer 12 and 14 may be patterned to form a matrix of crossovers if viewed from normal direction. For capacitive sensing means, each crossover of the two electrode layers may be addressed to measure local area capacitance between the two electrode layers at the crossover. For resistive sensing means, if applicable, each crossover may be addressed to determine whether an electrical contact between the two electrode layers occurs at location of the crossover. With such patterned scheme, positioning an input may be much more fast and accurate and post-measurement algorism to determine location of the input is much simpler. In an example of such scheme illustratively shown in FIG. 9, electrode layer 12 and 14 are patterned as a series of periodically repeated bars similar as grating lines, but respectively oriented along vertical and horizontal directions to form a matrix of crossovers, one of which is indicated by a circle 30. It is to be recognized that detail design and making of patterned electrode layers for touch input sensing has become well known in related art field and is within routine practice and workload of ordinary skilled personnel in related art fields, which may be useful for the invention upon enlightenments of teaching spirits of the disclosure.

Figure 10A:
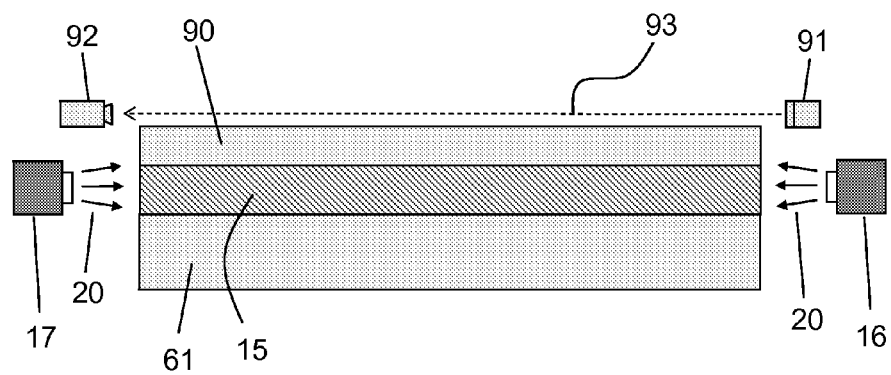
Figure 10B:
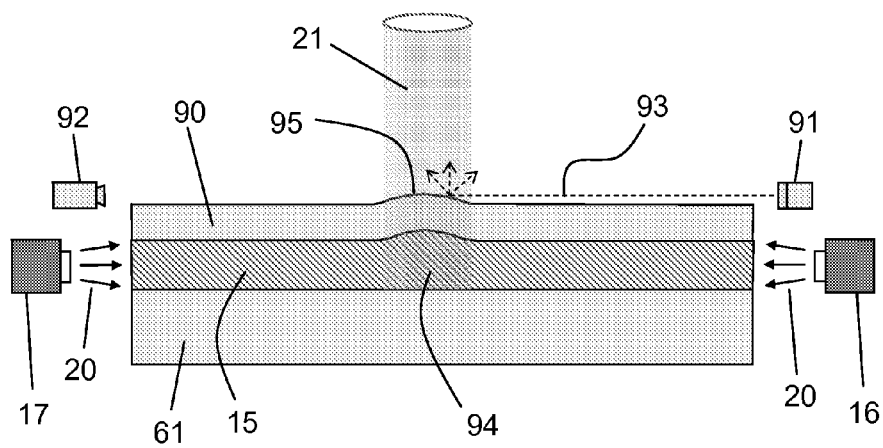

In accordance with the invention, another embodiment of the light activated input panel has a light activation panel, which comprises a layer of light-induced shape-memory polymer (LISMP) and a back plate having the layer of LISMP attached thereupon and a surface propagation sensing means incorporated together in such way that a localized volume change on the layer of LISMP caused by light activation is directly or indirectly detected by the sensing means. The surface propagation sensing means may be any similar sensing means used in touch input panel for detecting obstructive objective adjacent its sensing surface, but here in the embodiment for detecting obstructive presence of the localized volume change on the layer of LISMP. Normally, the surface propagation sensing means includes one or more emitters to send out surface propagated sensing medium such as infrared lights or ultrasound waves and one or more receivers to measure incoming surface propagated sensing medium set forth from the emitter or emitters. When the sensing medium across sensing surface is disturbed or obstructed, signal output of the receiver varies accordingly. Post-measurement processing may determine location of the disturbance or obstruction using signal output of the receiver. One example of the surface propagation sensing means has two infrared LED emitters placed at two corners of sensing surface and two photodetectors or imagers acting as receivers respectively placed at two diagonally opposite corners of the emitter corners. Another example of the surface propagation sensing manes has two ultrasound transducers acting as emitters placed at two corners and two microphones acting as receivers respectively placed at two diagonally opposite corners. The embodiment may be understood in more details and more clearly by referring several examples of the embodiment illustratively shown by cross-sectional drawings of FIG. 10A, 11A, and 12A In accordance with the invention, one example of the embodiment, as illustratively shown by cross-sectional drawing of FIG. 10A, has the surface propagation sensing means comprising an emitter 91 and a receiver 92 implemented right above top surface of the light activation panel comprising back plate 61 and layer 15 of LISMP attached with plate 61. The bottom surface of layer 15 of LISMP in contact with back plate 61 is also referred as back surface and the top surface of layer 15 is also referred as front surface, since any traverse surface movement caused by light activation occurs on the top surface or the front surface. Emitter 91 and receiver 92 face each other at opposite sides of layer 15. A line-of-sight sensing line 93 between emitter 91 and receiver 92 represents unobstructed path for surface propagation medium traveling across the top surface. Sensing line 93 is configured to be adjacent front surface of layer 15 of LISMP in order to detect any localized surface movement thereof caused by light activation. A cover plate 90, made of transparent material for activation light passing through, may be placed on top of layer 15 and closely beneath sensing line 93 to protect layer 15 from scratching and contamination. Side light source 16 and, optionally, side light source 17 are placed at sides of layer 15 for side restoration exposure by lights 20 of the restoration wavelength. Cover plate 90 help confine lights 20 within layer 15 during side restoration exposure, thus improving the restoration and preventing the lights from leaking out. Cover plate 90 should be easily deformable in order to show up underneath localized volume change on layer 15. It may be made of thin glass or quartz plate or thin polymer film. In operation, as illustratively shown by cross-sectional drawing of FIG. 10B, activation light beam 21 causes portion 94 of layer 15 under exposure by the beam experiencing a volume expansion, which, in turn, bends cover plate 90 upward to form a surface bump 95. Surface bump 95 interferes or obstructs surface propagation of the medium set forth from emitter 91, thus incurring a signal output variant in receiver 92. Therefore, location of light activation can be determined by the surface propagation sensing means. The localized volume expansion can be restored by side restoration exposure made by either one or both of side light source 16 and 17. It is to be recognized that the example of the embodiment may also work for a physical touch input made by a finger or a stylus on top surface of cover plate 90. In this situation, the sensing means may not tell whether an input comes from light activation or physical touch. To ensure proper operation, side restoration exposure may be performed following each time detection of an input regardless whether the input is caused by light activation or physical touch.

Figure 11A:
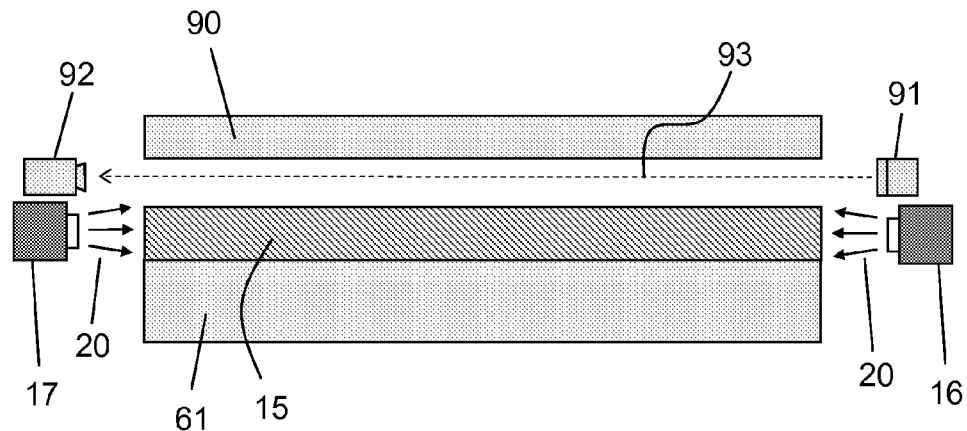
FIG. 11A is a cross-sectional drawing to illustratively show another example of the embodiment as mentioned above in the brief description of FIG. 10A.
Figure 11B:
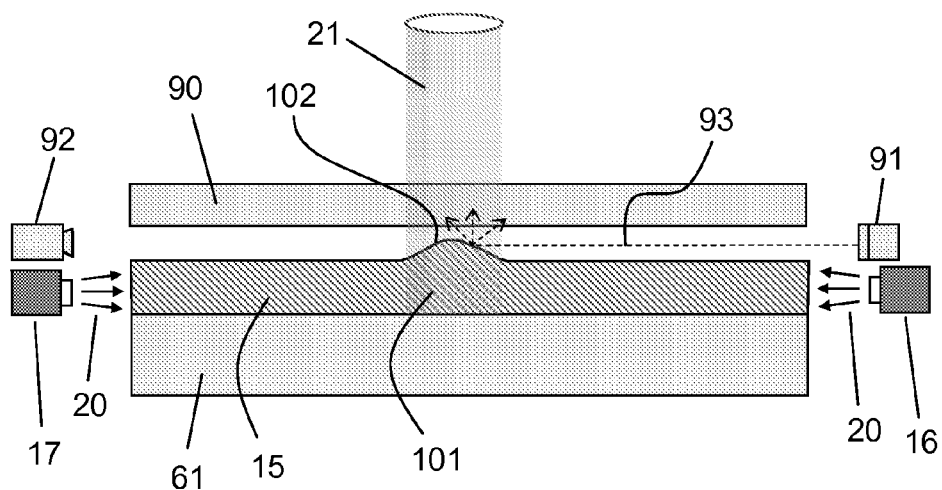
FIG. 11B is a cross-sectional drawing to illustratively show light activation operation of the example, when an incidence light beam shed thereupon causes a localized volume expansion in the layer of LISMP.

In accordance with the invention, a variant of the immediately above example, as illustratively shown by cross-sectional drawing of FIG. 11A, has cover plate 90 disposed above top surface of layer 15 by a predetermined gap such that surface propagation medium traveling from emitter 91 to receiver 92 is confined within the intermediate space between bottom surface of cover plate 90 and top surface of layer 15. Sensing line 93 is configured to be adjacent front surface of layer 15 of LISMP in order to detect any localized surface movement thereof caused by light activation. It provides several advantages comparing with the immediately above example. One advantage is that the surface propagation sensing means works more reliably and less susceptible to interference from ambient because cover plate 90 here isolates such interference outside. Another advantage is that the gap gives free space for layer 15 to transversely relieve localized volume change caused by light activation, thus more responsive to light activation. Another advantage may be that, if the intermediate space is sealed and filled with chemically inert gas such as Nitrogen or Argon or Helium, lifetime of the LISMP material may be extended. In operation, as illustratively shown by cross-sectional drawing of FIG. 11B, activation light beam 21 causes portion 101 of layer 15 under exposure by the beam experiencing a volume expansion to form a surface bump 102. Surface bump 102 interferes or obstructs surface propagation of the medium set forth from emitter 91, thus incurring a signal output variant in receiver 92. Therefore, location of light activation can be determined by the surface propagation sensing means. The localized volume expansion can be restored by side restoration exposure made by either one or both of side light source 16 and 17. It is to be recognized that the example of the embodiment may also work for a physical touch input made by a finger or a stylus on top surface of cover plate 90 to bend it downward to such extent that surface propagation of the medium set forth from emitter 91 is interfered or obstructed for detection. For the purpose, cover plate 90 should be deformable under force reasonably applied by the physical touch input. Plate 90 may become more deformable when its thickness is getting thinner. However, the thickness of plate 90 should not be too thin to maintain the predetermined gap.

Figure 12A:
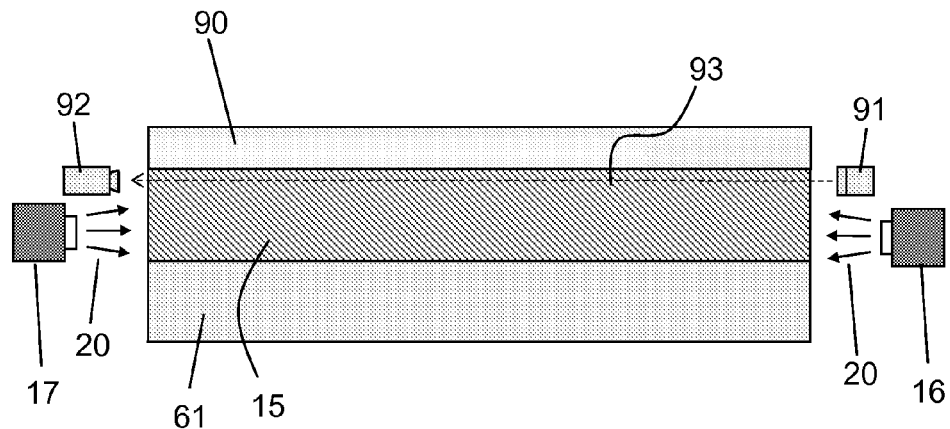
FIG. 12A is a cross-sectional drawing to illustratively show another example of the embodiment as mentioned above in the brief description of FIG. 10A.
Figure 12B:
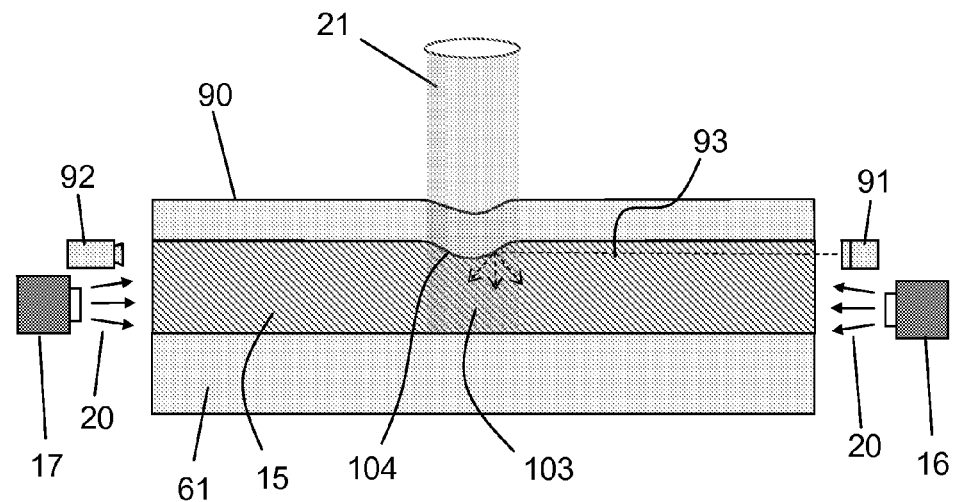
FIG. 12B is a cross-sectional drawing to illustratively show light activation operation of the example, when an incidence light beam shed thereupon causes a localized volume shrinkage in the layer of LISMP.

In accordance with the invention, another example of the embodiment, as illustratively shown by cross-sectional drawing of FIG. 12A, has the surface propagation sensing means comprising emitter 91 and receiver 92 implemented right under top surface of layer 15 of LISMP bonded with back plate 61, wherein layer 15 and plate 61 forms the light activation panel. The bottom surface of layer 15 of LISMP in contact with back plate 61 is also referred as back surface and the top surface of layer 15 is also referred as front surface, since any traverse surface movement caused by light activation occurs on the top surface or the front surface. Emitter 91 and receiver 92 face each other at opposite sides of layer 15. Line-of-sight sensing line 93 between emitter 91 and receiver 92 represents unobstructed path for surface propagation medium traveling through layer 15. Sensing line 93 is configured to be adjacent front surface of layer 15 of LISMP in order to detect any localized surface movement thereof caused by light activation. Cover plate 90, made of transparent material for activation light passing through, may be placed on top of layer 15 to protect layer 15 from scratching and contamination. Side light source 16 and, optionally, side light source 17 are placed at sides of layer 15 for side restoration exposure by lights 20 of the restoration wavelength. Cover plate 90 help confine lights 20 within layer 15 during side restoration exposure, thus improving the restoration and preventing the lights from leaking out. Cover plate 90 should be easily deformable in order to follow underneath localized volume shrinkage on layer 15. It may be made of thin glass or quartz plate or thin polymer film. In operation, as illustratively shown by cross-sectional drawing of FIG. 12B, activation light beam 21 causes portion 103 of layer 15 under exposure by the beam experiencing a volume shrinkage, which, in turn, has cover plate 90 deformed downward to form a surface recess 104. In this situation, atmosphere pressure may facilitate the deformation to form surface recess 104. To have the facilitation, one way is to seal the interface between cover plate 90 and layer 15 from ambient air. Another way is to bond cover plate 90 with layer 15 by using any applicable bonding method, for example adhesive bonding. Surface bump 104 interferes or obstructs surface propagation of the medium set forth from emitter 91, thus incurring a signal output variant in receiver 92. Therefore, location of light activation can be determined by the surface propagation sensing means. The localized volume shrinkage can be restored by side restoration exposure made by either one or both of side light source 16 and 17.

Figure 13A:
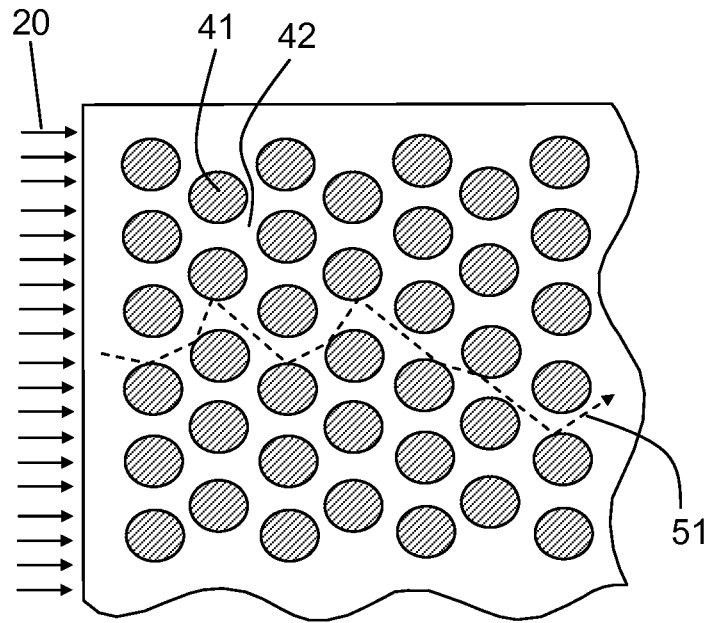
FIGS. 13A and 13B are schematics in normal direction view to illustrate basic concept of improving intensity distribution of side exposure lights along lateral length of the patterned layer of LISMP.
Figure 13B:
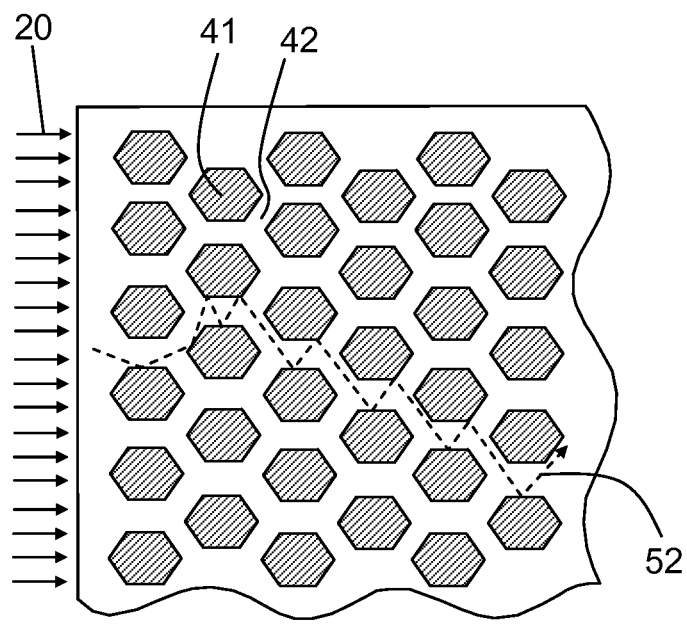

In all above embodiments, if layer 15 of LISMP is patterned as disclosed previously in this disclosure, configuration of its patterns may take account of intensity distribution of lights 20 for side restoration exposure along lateral length of layer 15. By configuring material portions 41 and spacing portions 42 properly, some lights of lights 20 may travel along spacing portions by scattering at sidewalls of material portions 41, thus going deeper along lateral length of layer 15 before being absorbed for exposure. Therefore, intensity distribution of lights 20 along lateral length of layer 15 may be improved to be more uniform for side restoration exposure. Furthermore, shapes of material portions 41 play a role to affect internal scattering of lights 20, thus should be considered as well for the purpose thereof. For example, as illustratively shown by the drawing of FIG. 13A, material portions 41 have a circular cross-section. A light path 51 along spacing portions 42 illustratively shows how some lights of lights 20 are scattered repeatedly by material portions 41 to go deeper into layer 15 before being absorbed for exposure. For another example, as illustratively shown by the drawing of FIG. 13B, material portions 41 have a hexagonal cross-section. A light path 52 along spacing portions 42 illustratively shows how some lights of lights 20 are scattered repeatedly by material portions 41 to go deeper into layer 15 before being absorbed for exposure. Although the drawings show uniform shape and distribution of material portions 41, varying shapes and distributions of material portions 41 may be implemented to further improve uniformity of the intensity distribution. Design of the varying patterns for patterned layer 15 may be facilitated by simulations based on diffusion equation and internal scattering modeling.

The light activated input panel may be operated with a light pen or light stylus for contact or proximity operation or a light pointer for remote operation. An example design for light pointing device such as light pen, light stylus or light pointer is illustratively given in drawing of FIG. 14. In the drawing, light stylus 110 has a pen-like body 111 having an open end and a close end with a focus lens 114 fitted in the open end. Inside body 111, from the close end to the open end, are following components: power storage 115, control 113, and light source 112 to output lights for light activated input. Power storage 115 supplying electrical energy may be a battery or a large capacity capacitor. Control 113, connected to power storage 115 and light source 112, controls power on or off of light source 112. Light source 112 may be a LED or a matrix of LEDs capable of outputting lights of the activation wavelength for LISMP material used in the light activated input panel in accordance with the invention. A switch 116 installed on body 111 is internally connected to control 113 for operator to turn on or off output light beam 119 set forth by light source 112 and focused by lens 114. It is to be recognized that this example design is for illustration purpose only and a detailed design for light stylus or light pen or light pointer may be more complex but still within routine works and normal skills of ordinary skilled personnel in related art field upon the illustrative teaching provided here.

Light activated input panel may experience an issue that it may be accidentally activated by ambient light or become less responsive under interference from ambient light. In view of this aspect, it is preferable to have wavelength of incidence light beam for operation falls outside of typical wavelength range of normal ambient light in wavelength spectrum. Considering room light mostly within visual light spectrum, the light activated input panel, in accordance with the invention, using light-induced shape memory polymer having shape switched under UV lights is believed to have operational advantage of less susceptible to room light interference. However, using UV light beam in operation may raise a safety concern regarding UV hazard to human eyes. This issue may be addressed to be solvable through taking one or more of following measures: First, anti-reflection-coating for the UV wavelength in use for light activation may be deposited on front surface of the input panel to reduce surface reflection or scattering of activation light incoming from light pointing device such as light pen, light stylus or light pointer; Second, an interlock means to disable light output of light pointing device when it is not pointing at front surface of the input panel may be included in the device in use for operating the input panel, which prevents activation light from turn-on if the pointing device is not directed in intended way; Third, as mentioned previously in this disclosure, performing restoration light exposure in sideway effectively prevents the light of the restoration wavelength from going outside, thus not harmful or irritating to user or ambient environment. In order for user to see pointing spot of UV light beam sent from the light pointing device on front surface of the input panel, a layer of phosphor converting UV lights into visible lights may be put on the surface to indicate the pointing spot. The layer of phosphor may also be implemented internally inside the light activated input panel for the purpose of indicating the pointing spot. Or, Phosphor materials may be mixed with LISMP materials inside the layer of LISMP for the same purpose. One example of the interlock means is illustratively given by an example design of the light pointing device illustratively shown in the drawing of FIG. 15. In the drawing, a photosensor 117 is positioned next to light source 112 made of LEDs, which has lights 118 incoming from front direction of lens 114 shed thereupon. When light pointer 110 is directed at front surface of the light activated input panel, lights 118 may be part of lights of images displayed through the input panel on the underneath display having the input panel attached atop. Or, lights 118 may be lights set forth by a dedicated light emitter or emitters spatially associated with the front surface, for example, an Infrared LED or LEDs placed next to edge or edges of the front surface. Lights 118 may contain a predetermined coded signal for identification purpose, thus having photosensor 117 outputting a corresponding predetermined signal. Photosensor 117 connected to control 113 sends its output signal to the control to tell that the pointing device is directed at intended direction. If so, control 113 allows light source 112 to be turned on for operation. Otherwise, control 113 disable turn-on of light source 112. With this interlock means, the light pointing device only sets forth activation light for operation when user points the pointing device at the input panel accordingly. Another example of the interlock means is to include a contact or proximity sensor at or near touching end of the light pointing device for contact or proximity operation of light activation. When the pointing device is pressed on or presented very close to front surface of the light activated input panel, the contact or proximity sensor detects such action and enables the control of the device to permit light output. Otherwise, the light output is disabled by the control. Thus, the light pointing device only outputs lights for operation when user uses it in contact with or in proximity to the input panel. It is obvious that this interlock means using contact or proximity sensor is not suitable for remote operation, in which user is normally far away from the input panel. To further enhance the safety, the side restoration exposure should have restoration lights on as short as sufficient to restore the layer of LISMP. Therefore, it is believed that, with proper measures taken, UV hazard of using UV light in operation of the light activated input panel, if applicable, could be reduced or minimized to allowable or acceptable level.

In accordance with the invention, the light activated input panel may be used in any application where touch input interface or remote input interface is desired, especially useful in the application desiring to operate with a light pointing device such as a light pen or light stylus or a light pointer. One example of application of the light activated input panel is to attach it on screen of a flat panel display. Then, a light pen or light stylus or light pointer can be used to perform a variety of input actions on the screen such as interface control, dragging, drawing and so on. The example is illustratively shown by the drawing of FIG. 16, in which a light activated input panel 60 in accordance with the invention is attached with viewing surface of a flat panel display 160. Display 160 may be liquid crystal display (LCD), LED matrix display, OLED (Organic Light Emitting Diode) display, Plasma Display Panel (PDP) display, Electrophoretic display or the like, or, any other type flat panel display. The example as illustrated in the drawing may be used as a display with light activated input capability for computer related applications or Flat Panel Television (TV). The Flat Panel TV embodying the example permits user using light pointer to remotely operate user interface display on the TV screen for a variety of operations such as web surfing, message checking, program selection, TV control and so on. The user viewing scenario is illustratively shown by the drawing of FIG. 17. In the showing, a flat panel TV 180 embodying the example further comprises a LED emitter 181 at edge of body frame of the TV. Front surface 182 is the viewing surface to display pictures for viewing by the viewer and also light input surface of light activated input panel 60. The viewer handles a light pointer 185 to shed a light beam 186 for light activation upon surface 182 to direct operations of the TV. Light beam 186 effectively illuminates area 187 on surface 182, thus giving a corresponding light activated input for the TV to respond. LED emitter 181 sends infrared lights forward within space ranging between line 183 and line 184, which is sufficient to cover normal sitting range of viewer. The infrared light is for the interlock means, as mentioned above, of light pointer 185 to ensure light beam 186 is only sent out when the pointer is directed at front surface 182. When display size goes larger, the light activated input panel based on surface propagation sensing means is believed to be more advantageous in cost of making than that based on capacitive or resistive sensing means. FIG. 18 illustratively shows a possible detailed structure of the example of application using liquid crystal display for display 160 and the light activated input panel based on surface propagation sensing means for input panel 60. In the drawing, flat panel display 160 of liquid crystal display comprises, from left to right on the drawing page, a backlight 161, a first polarizer layer 162, a first support substrate 163, a first electrode layer 164 for liquid crystal polarization steering, a liquid crystal layer 165, a second electrode layer 166 for liquid crystal polarization steering, a second support substrate 167, a color filter layer 168 and a second polarizer layer 169, which collectively form working structure of liquid crystal display. Starting from display 160 to right, light activated input panel 60 has its components arranged accordingly similar as the embodiment example of the light activated input panel illustratively shown in FIG. 11A. Another example of application of the light activated input panel is to make a digitizer or a touchpad working in conjunction with light pen or light stylus. In this example of application, light pen or light stylus is normally held in gentle contact with or in proximity to front surface of the input panel. No mechanical press force is required for operation, Thus, a rigid cover plate may be used on the input panel, which is transparent to activation light for light activated input but strong to resist mechanical deformation applied externally. This makes it very robust for long term use. In the example of application, light pen or light stylus with the interlock means using contact or proximity sensor as described previously in this disclosure is more desirable for operating the input panel. It should be understood that these examples of application of the light activated input panel are provided for enlightening public about its potentials on applications and should not be recognized as all or only possible applications thereof. Furthermore, the teaching on examples of application of the light activated input panel is considered to be included in the invention of this disclosure according to maximum extent that its technical merits allow.

It should be understood that embodiments disclosed are only a few examples of possible implementations of the invention disclosed in the disclosure and their teachings may be used by ordinary skilled in related art to modify the embodiments or derive from the embodiments to form embodiment appearing not similar as the embodiments but still utilizing true merit and teaching spirit of the invention. Therefore, if any, the modification or derivation is still within the scope of the invention and all related rights are reserved.

I claim:

1. An input panel operable by light comprising:
a first electrode layer;
a second electrode layer opposing said first electrode layer with a predetermined gap between the two electrode layers, wherein said first electrode layer and said second electrode layer form capacitive sensing means capable of determining location of a capacitance variant between said electrode layers; and,
a layer of light-induced shape-memory polymer disposed in between said first electrode layer and said second electrode layer,
whereby, in operation, a shape variation of a portion of said layer of light-induced shape-memory polymer activated by incidence of a light beam with a first predetermined wavelength causes said capacitance variant.

2. The input panel of claim 1 wherein said layer of light-induced shape-memory polymer is made of a plurality of material portions, which is made of light-induced shape-memory polymer material, and a plurality of spacing portions intermixing one another.

3. The input panel of claim 1 further comprising a side light source disposed next to side of said layer of light-induced shape-memory polymer in such way that lights outputted by said side light source having a second predetermined wavelength pass traversely through said layer of light-induced shape-memory polymer, whereby, in operation, said lights of said second predetermined wavelength restores said shape variation.

4. The input panel of claim 3 wherein said layer of light-induced shape-memory polymer is made of a plurality of material portions, which is made of light-induced shape-memory polymer material, and a plurality of spacing portions intermixing one another.

5. The input panel of claim 3 wherein said layer has one side attached with said first electrode layers and the other side disposed with a predetermined distance from said second electrode layer.

6. The input panel of claim 1 wherein said layer is sandwiched by said first electrode layer and said second electrode layer.

7. The input panel of claim 6 wherein said layer of light-induced shape-memory polymer is made of a plurality of material portions, which is made of light-induced shape-memory polymer material, and a plurality of spacing portions intermixing one another.

8. The input panel of claim 1 wherein said layer has one side attached with said first electrode layers and the other side disposed with a predetermined distance away from said second electrode layer.

9. The input panel of claim 8 wherein said layer of light-induced shape-memory polymer is made of a plurality of material portions, which is made of light-induced shape-memory polymer material, and a plurality of spacing portions intermixing one another.

10. An input panel operable by light comprising:
a light activation panel comprising a layer of light-induced shape-memory polymer having a back surface and a front surface and a back plate having said layer attached thereupon, wherein said back surface is adjacent said back plate; and, a sensing means incorporated with said light activation panel in such way that a surface deformation of a portion of said front surface is detectable by said sensing means to determine location of said portion, whereby, in operation, said surface deformation of said portion is caused by activating said portion with incidence of a light beam of a first predetermined wavelength thereupon.

11. The input panel of claim 10 wherein said light activation panel further comprises a side light source disposed adjacent side of said layer of light-induced shape-memory polymer in such way that lights outputted by said side light source having a second predetermined wavelength pass through said layer traversely, whereby, in operation, said lights of said second predetermined wavelength restores said surface deformation.

12. The input panel of claim 10 wherein said layer of light-induced shape-memory polymer is made of a plurality of material portions, which is made of light-induced shape-memory polymer material, and a plurality of spacing portions intermixing one another.

13. The input panel of claim 10 wherein said sensing means comprises two electrode layers disposed in parallel to each other and separated by a predetermined gap in between them, and, said front surface is attached with one of said electrode layers.

14. The input panel of claim 13 wherein said light activation panel further comprises a side light source disposed adjacent side of said layer of light-induced shape-memory polymer in such way that lights outputted by said side light source having a second predetermined wavelength pass through said layer traversely, whereby, in operation, said lights of said second predetermined wavelength restores said surface deformation.

15. The input panel of claim 14 wherein said layer of light-induced shape-memory polymer is made of a plurality of material portions, which is made of light-induced shape-memory polymer material, and a plurality of spacing portions intermixing one another.

16. The input panel of claim 10 wherein said sensing means comprises an emitter to and an receiver opposing each other to form a sensing line in between them, and, said sensing line is configured to be adjacent said front surface.

17. The input panel of claim 16 wherein said light activation panel further comprises a side light source disposed adjacent side of said layer of light-induced shape-memory polymer in such way that lights outputted by said side light source having a second predetermined wavelength pass through said layer traversely, whereby, in operation, said lights of said second predetermined wavelength restores said surface deformation.

18. The input panel of claim 17 wherein said layer of light-induced shape-memory polymer is made of a plurality of material portions, which is made of light-induced shape-memory polymer material, and a plurality of spacing portions intermixing one another.

19. The input panel of claim 16 further comprising a cover plate disposed above said sensing line.

* * * * *